United States Patent

Clifton

(10) Patent No.: US 7,170,655 B2
(45) Date of Patent: Jan. 30, 2007

(54) AUTOMATIC SCAN SENSOR IMAGE PROCESSING

(75) Inventor: Lori Clifton, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 724 days.

(21) Appl. No.: 09/897,254

(22) Filed: Jul. 2, 2001

(65) Prior Publication Data

US 2003/0002090 A1   Jan. 2, 2003

(51) Int. Cl.
    H04N 1/04    (2006.01)
    H04N 1/46    (2006.01)
(52) U.S. Cl. ............ 358/486; 358/474; 358/496; 358/505
(58) Field of Classification Search .......... 358/475, 358/445, 446, 447, 487, 461, 486, 474, 496, 358/498, 505
    See application file for complete search history.

(56) References Cited

U.S. PATENT DOCUMENTS

| 5,139,339 | A | * | 8/1992 | Courtney et al. ........... 356/446 |
| 5,796,928 | A | * | 8/1998 | Toyomura et al. .......... 358/1.6 |
| 5,995,204 | A | * | 11/1999 | Hoshino et al. ............ 355/75 |
| 6,291,829 | B1 | * | 9/2001 | Allen et al. ........... 250/559.07 |
| 6,498,867 | B1 | * | 12/2002 | Potucek et al. ............ 382/274 |
| 6,599,041 | B1 | * | 7/2003 | Ahne et al. ................ 400/582 |
| 6,714,324 | B1 | * | 3/2004 | Kurosawa et al. .......... 358/487 |
| 2001/0009588 | A1 | * | 7/2001 | Fujinawa et al. .......... 382/112 |
| 2004/0012827 | A1 | * | 1/2004 | Fujinawa et al. .......... 358/474 |

* cited by examiner

Primary Examiner—Edward Coles
Assistant Examiner—Houshang Safaipour

(57) ABSTRACT

A device that scans an image from source media automatically detects the source media type being scanned. Interpretation of scanned data may be automatically adjusted based on the source media type sensed. In this way, the quality of the scanned data and the images produced from it can be improved by making adjustments appropriate to the source media type scanned.

10 Claims, 1 Drawing Sheet

AUTOMATIC SCAN SENSOR IMAGE PROCESSING

FIELD OF THE INVENTION

This invention relates to scanning, and more particularly to adjusting the interpretation of scanned data based on automatic detection of physical characteristics of the scanned media.

BACKGROUND

Copiers, scanners, and other devices that scan images from source media and convert those images to data are common in business and home environments. A typical scanner scans one or more images from source media, converting those one or more images to data. A software program typically interprets that data and converts it to a data file for storage and use. Such a data file may be in GIF, JPEG, or other format. A copier typically scans one or more images from source media. A digital copier converts those one or more images to data and stores that data. That stored data is then interpreted by a controller or other device within the copier, and transmitted to a marking engine within the copier. The marking engine produces one or more copies of the image on destination media.

The source media used with a copier, scanner or other such device can be any media that can be placed onto a scanning surface. Such source media may include standard paper, bond paper, glossy paper, transparencies, photographs, and a number of other different kinds of media. The properties of the image data scanned from these different source media may vary according to the source media type. For example, image data scanned from a transparency often has blurry edges, as a result of the transparency of the source media. As another example, image data scanned from one side of thin or translucent source media having images printed on both sides may include undesired background material bleeding through the source media from the opposite side. To ameliorate these problems, copiers often include controls for varying the contrast or other properties of the copies printed on the destination media. However, to the extent these controls are effective, their use is a matter of trial and error for the operator, resulting in waste of destination media as well as user frustration. While scanners do not typically offer such controls, imaging software utilized with scanners typically includes such controls in software, where those controls relate to the display of the scanned data. These controls result in similar limitations and problems as described with regard to the copier controls.

SUMMARY

A scanning device adjusts the interpretation of scanned data based on automatically-detected source media type.

In one aspect of the invention, a device that scans an image from source media automatically detects the source media type being scanned. A sensor may detect the translucency of the media in order to determine the source media type.

In another aspect of the invention, interpretation of scanned data may be automatically adjusted based on the source media type sensed. Such interpretation includes interpretation of scanned data within a copier before transmission to a marking engine, and interpretation of scanned data by a software program for conversion to a data file. In this way, the quality of the scanned data and the images produced from it can be improved by making adjustments appropriate to the source media type scanned.

The invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
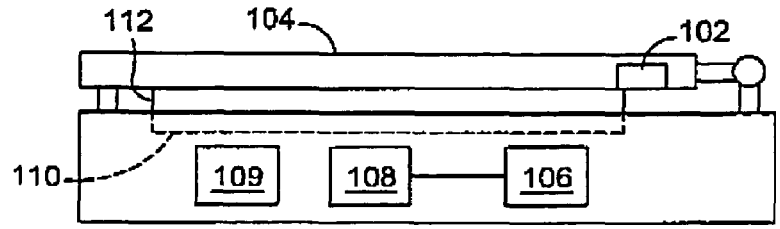
FIG. 1 is a block diagram of one embodiment of a scanning component of a device that provides for scanning source media.

Referring to FIG. 1, a block diagram of one embodiment of a scanning device 100 is shown. The scanning device 100 may be a standalone scanner adapted for connection to an information handling system, a portion of a copier, or any other device adapted to scan images from source media. The scanning device 100 includes structures, mechanisms and/or software for scanning images from source media, and is standard to one of ordinary skill in the art.

The scanning device 100 includes a scan module 109 for scanning source media 112 and a window 110 on which source media 112 may be placed. The window 110 is substantially clear, and allows the structures and/or mechanisms used for scanning images such as scan module 109 to view the source media 112 without the need to contact the source media or expose those structures and/or mechanisms. The use of a window 110 on a scanning device 100 is standard in the art.

The scanning device 100 includes a cover 104. The cover 104 may be connected to the scanning device 100 via a hinge or other mechanism, such that the cover may be lifted away from the scanning device 100 as needed. The cover 104 is adapted to cover the window 110 when no source media 112 is placed on the window 110, and to substantially cover relatively thin source media 112 placed on the window 110. In one embodiment, the cover 104 may be connected to, or may be a part of, a feeder device (not shown) that automatically feeds source media 112 to be scanned onto the window 110. Such a feeder device is standard to one skilled in the art, and may be of a type commonly utilized as a copier component.

In the embodiment shown in FIG. 1, a light source 102 is connected to the cover 104, and positioned to face the window 110. The light source 102 may be mounted to the cover 104 in any manner that provides for a secure connection between them, and that substantially prevents the light source 102 from interfering with, damaging or being damaged by source media 112 and/or the window 110. The light source 102 may be a light-emitting diode (LED), an incandescent light, or any other source of light. The light source 102 is connected to a power supply (not shown) within the scanning device 100 to receive power to generate illumination.

A sensor 106 is provided within the scanning device 100, behind the window 110. The sensor 106 is positioned relative to the light source 102 such that the source media 112 is interposed between them. Further, the sensor 106 and the light source 102 are substantially aligned with one another, such that the light source 102 is substantially directed toward the sensor 106. The sensor 106 is adapted to sense the particular frequency or frequencies of light emitted by the light source 102. Thus, if the light source 102 is an LED emitted light at a particular frequency, the sensor 106 is adapted to detect that frequency. The sensor 106 may be a photoelectric cell, a charge-coupled device (CCD), or other device adapted to sense light. In one embodiment, the sensor 106 outputs an analog electrical signal that corresponds to the light level that it senses. In another embodiment, the sensor 106 outputs a digital electrical signal that corresponds to the light level it senses.

The sensor 106 is electrically connected to a controller 108. The controller 108 may be a microprocessor, an application-specific integrated circuit (ASIC), a field-programmable gate array (FPGA), or other device. Among other functions, the controller 108 processes information received from the sensor 106. If the scanning device 100 is a component of another device, the controller 108 may pass information received from the sensor 106 to that other device. In another embodiment, if the scanning device 100 is a component of another device, the controller 108 may be omitted altogether, such that the sensor 106 transmits analog and/or digital signals to an information processing component of that device.

Figure 2:
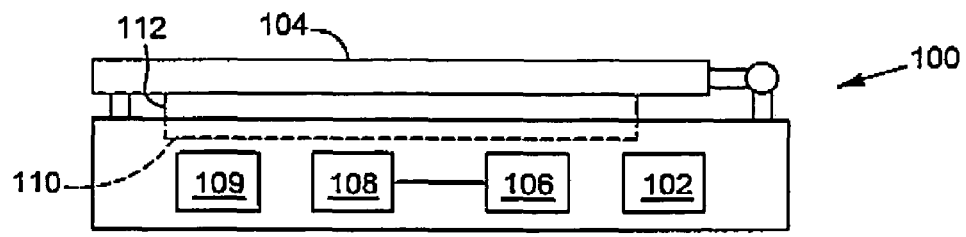
FIG. 2 is a block diagram of another embodiment of a scanning component of a device that provides for scanning source media.

Referring to FIG. 2, another embodiment of the scanning device 100 is shown. This embodiment of the scanning device 100 is substantially the same as the first embodiment described above, except for the placement of the light source 102 and the sensor 106. In this embodiment, the light source 102 and the sensor 106 are both located within the scanning device 100 on the same side of the window 110. The light source 102 and the sensor 106 are positioned relative to one another such that a portion of the light from the light source 102 may be reflected from the source media 112 to the sensor 106. In this embodiment, the cover 104 has an interior surface facing the window 110 that is substantially white in color, and has substantially the same reflective properties over its entire surface. This interior surface of the cover 104 assists in reflecting into the sensor 106 light that passes through the source media 112, as is described in greater detail below.

Figure 3:
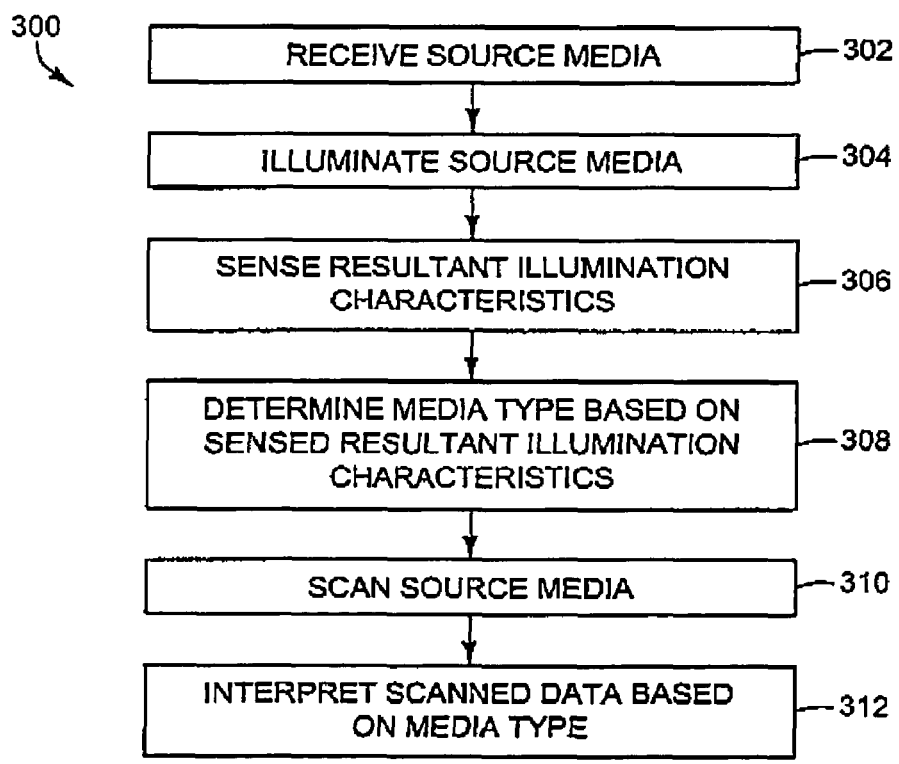
FIG. 3 is a flow chart of a method for adjusting the interpretation of scanned data based on automatically-detected source media type.

Referring as well to FIG. 3, a method 300 is shown for adjusting the interpretation of scanned data based on the type of source media scanned. In block 302, source media 112 is received by the scanning device 100. In one embodiment, the source media 112 is placed in contact with the window 110 such that an image to be scanned from the source media 112 faces downward toward the window 110. The cover 104 may be lowered over the source media 112 if the source media 112 is sufficiently thin. That is, if the source media 112 is a sheet of paper or other thin media, the cover 104 can be closed onto it. If the source media 112 is a book or other large object, the size of the source media 112 may prevent the cover 104 from closing over the source media 112.

In block 304, the source media 112 is illuminated. Illumination is provided by the light source 102. In one embodiment, the light source 102 may be switched on in block 304, then switched off when no longer needed in the method 300. However, the light source 102 may remain illuminated for a longer period, if desired. For example, the light source 102 may be illuminated at all times while the scanning device 100 is operational.

In the embodiment of the scanning device 100 in which the light source 102 is connected to the cover 104, and positioned to face the window 110, the cover 104 is closed over the source media 112. In this embodiment, the light source 102 illuminates the upper surface of the source media 112. A portion of that illumination travels through the source media 112. If the source media 112 is opaque, that portion is zero. If the source media 112 is transparent or translucent, that portion is greater than zero. The amount of illumination passing through the source media 112 is related to the translucency of the source media 112, and thus to the type of the source media 112.

In the embodiment of the scanning device 100 in which the light source 102 is located within the scanning device 100 on the same side of the window 110 as the sensor 106, the cover 104 is closed over the source media 112 if the source media 112 is sufficiently thin. However, if the source media 112 is large, such as a book or other bulky object, the cover 104 need not be closed. In this embodiment, the light source 102 illuminates the lower surface of the source media 112. A portion of that illumination is reflected from the source media 112. The amount of illumination reflected from the source media 112 is related to the type of source media 112, and is also related to the optical properties of the inner surface of the portion of the cover 104 from which illumination may be reflected. Reflection from the inner surface of the cover 104 may occur where the source media 112 is a transparency or other substantially transparent media, such that illumination travels through the source media 112, is reflected from a portion of the inner surface of the cover 104, then travels back through the source media 112.

In block 306, the resultant illumination received at the sensor 106 is measured. The illumination received at the sensor 106 is a result of the transmission of illumination through, or the reflection of illumination from, the source media 112. The measurement of the resultant illumination at the sensor 106 may be a measurement of the intensity of the illumination. Other characteristics of the resultant illumination may be measured in addition to, or instead of, the intensity of the illumination.

In block 308, the media type is determined based on the characteristics of the resultant illumination measured by the sensor 106. The characteristics of this resultant illumination are related to the media type of the source media 112. For example, the characteristics of the resultant illumination will be different for transparencies, bond paper, photographic paper, and cardboard. In one embodiment, the controller 108 compares the characteristics of the resultant illumination measured by the sensor 106 to stored illumination data, to match the measured characteristics to a particular media type. In another embodiment, the controller 108 converts the characteristics of the resultant illumination to an index or other reference number relating to the translucency of the source media 112. In such an embodiment, determining the media type refers to determining the translucency of the source media 112. The determination of media type may be stored in the controller 108 or in a memory storage device (not shown) connected to the controller 108, for later use. This information may be stored in another location or a different location in a device connected to the scanning device 100, if desired.

In block 310. the source media 112 is scanned with scan module 109. The scanning process, and the mechanisms to perform it, such as scan module 109. are standard to one of ordinary skill in the art. As a result of the scanning process, raw data is generated that represents an image present on the side of the source media 112 facing the window 110. This raw data may be received by the controller 108 and stored in a memory storage unit (not shown) within the scanning device 100, or may be received and stored at a location in a device connected to the scanning device 100.

In block 312, interpretation of the raw data obtained in block 310 is adjusted based on the media type of the source media 112. The raw data obtained in block 310 is interpreted by the controller 108 or other device in order to convert that raw data into a usable form. Such interpretation is standard to those of ordinary skill in the art. Interpretation of the raw data may include interpretation of the raw data before transmitting that data to a marking engine, interpretation of the raw data for conversion to a data file such as a JPEG file, or other types of interpretation.

Adjustments to the interpretation of the raw data are made based on the media type of the source media 112. As an example, the media type of the source media 112 may be a transparency. Typically, the data that results from the scan of a transparency includes blurry edges, as a result of the transparent nature of the source media 112. Because the media type was determined to be a transparency, the interpretation of the raw data is adjusted automatically to sharpen the edges of the scanned image, thereby compensating at least in part for scan defects resulting from the nature of the source media 112. As another example, the media type of the source media 112 may be thin glossy paper, such as a page of a magazine. Typically, the data that results from a scan of such thin glossy paper printed on both sides includes image artifacts from the side of the paper facing away from the window 110. Because the media type was determined to be thin glossy paper, the interpretation of raw data is adjusted automatically to remove those image artifacts via a background removal process. Other adjustments may be made to these and other media types, in order to at least partially correct scan defects associated with the type of the scanned source media 112.

In one embodiment, instructions for implementing the method 300 are provided as a computer program product. A computer program product is a set of instructions for a device such as a controller 108. The computer program product may be stored in a memory storage device within or connected to the scanning device 100. The computer program product may be received into the scanning device 100 or associated device via a communications network, a compact disc, a removable hard disk, a removable optical disk, flash memory, or any other hardware, network, device or method capable of storing and/or transmitting data.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A device for determining the media type of source media, comprising:
    a light source positioned to illuminate at least a portion of the source media;
    a sensor positioned relative to said light source to view at least a portion of the source media illuminated by said light source, said light source media being interposed between said light source and said sensor;
    a controller connected to said sensor; and
    a scan module for scanning the source media, said scan module having scanning functionality discrete from said light source and said sensor and said scan module connected to said controller, wherein said controller is configured to determine the media type of the source media based on data received from said sensor sensing the illuminated source media, said data representing amount of light reflected from the source media or the translucency of the source media, the and said controller is further configured to interpret scan data received from said scan module based on said determination.

2. The device of claim 1, wherein said light source is a light emitting diode.

3. The device of claim 1, wherein said light source is incandescent.

4. The device of claim 1, wherein said sensor is a photoelectric cell.

5. The device of claim 1, wherein said sensor is a charge-coupled device.

6. The device of claim 1, wherein the source media has a surface, and wherein said light source and said sensor both face said surface.

7. A method for adjusting the interpretation of scanned data based on the type of source media scanned, comprising:
    illuminating at least a portion of the source media;
    sensing at least part of the illuminated portion of the source media;
    determining the media type of the source media based on data received from said sensing, said data representing the translucency of the source media;
    scanning the source media;
    generating data as a result of said scanning; and interpreting said data based on said determined media type.

8. The method of claim 7, wherein said determining comprises selecting one of a plurality of preset media types based on said sensing.

9. A computer program product embodied in a computer readable medium for adjusting the interpretation of scanned data based on the type of source media scanned, comprising:
    instructions for illuminating at least a portion of the source media;
    instructions for receiving data produced by sensing at least part of the illuminated portion of the source media;
    instructions for determining the media type of the source media based on said data produced by said sensing, said data representing the translucency of the source media;
    instructions for scanning the source media;
    instructions for generating data as a result of said scanning; and
    instructions for interpreting said data based on said determined media type.

10. The computer program product of claim 9, wherein said instructions for determining comprise instructions for selecting one of a plurality of preset media types based on said sensing.

* * * * *

UNITED STATES PATENT AND TRADEMARK OFFICE
CERTIFICATE OF CORRECTION

PATENT NO. : 7,170,655 B2 Page 1 of 1
APPLICATION NO. : 09/897254
DATED : January 30, 2007
INVENTOR(S) : Lori Clifton It is certified that error appears in the above-identified patent and that said Letters Patent is hereby corrected as shown below:

In column 2, line 38, after "media" insert -- 112 --.

In column 6, line 1, in Claim 1, after "said" delete "light".

In column 6, line 10, in Claim 1, after "representing" insert -- an --.

In column 6, line 12, in Claim 1, after "media," delete "the".

Signed and Sealed this

Eighteenth Day of November, 2008

JON W. DUDAS
*Director of the United States Patent and Trademark Office*